United States Patent [19]
Wei

[11] Patent Number: 6,052,704
[45] Date of Patent: Apr. 18, 2000

[54] EXPONENTIATION CIRCUIT AND INVERTER BASED ON POWER-SUM CIRCUIT FOR FINITE FIELD GF($2^M$)

[75] Inventor: Shyue-Win Wei, Hsin-Chiu, Taiwan

[73] Assignee: National Science Council, Taipei, Taiwan

[21] Appl. No.: 09/005,882

[22] Filed: Jan. 12, 1998

[51] Int. Cl.[7] .................................................. G06F 7/72
[52] U.S. Cl. ............................................................ 708/492
[58] Field of Search ..................................... 708/492, 606

[56] References Cited

U.S. PATENT DOCUMENTS

| | | | |
|---|---|---|---|
| 4,890,252 | 12/1989 | Wang | 708/492 |
| 5,206,824 | 4/1993 | Arazi | 708/492 |
| 5,448,510 | 9/1995 | Lee | 708/492 |
| 5,467,297 | 11/1995 | Zook | 708/492 |
| 5,612,910 | 3/1997 | Meyer | 708/492 |

Primary Examiner—David H. Malzahn
Attorney, Agent, or Firm—Tung & Associates

[57] ABSTRACT

Circuits, designed on the basis of power-sum circuits, for performing exponentiation ($B^N$) and inversion ($B^{-1}$) computations in finite field GF($2^m$) where B is an arbitrary elements of GF($2^m$), are presented. The circuit for performing inversion ($B^{-1}$) computations can be deemed another version of the circuit performing exponentiation ($B^N$) computations. With pipeline architecture and on the basis of power-sum circuits, these circuits are featured by simplicity, regularity, and broader application (applicable to an arbitrary element of the finite field).

24 Claims, 8 Drawing Sheets

EXPONENTIATION CIRCUIT AND INVERTER BASED ON POWER-SUM CIRCUIT FOR FINITE FIELD GF($2^M$)

FIELD OF THE INVENTION

The present invention generally relates to a circuit for performing, based on the power-sum circuit disclosed in U.S. patent application Ser. No. 08/966,148, filed Nov. 11, 1997, entitled "Power-Sum Circuit For Finite Field GF ($2^m$), computations of $b^N$ (power N of b) and $b^{-1}$ (multiplicative inverse of b) in a finite fieldGF($2^m$) where b is an arbitrary element of GF($2^m$).

BACKGROUND OF THE INVENTION

Index Terms: Coding theory, finite field, power-sum, exponentiation, multiplicative inverse, VLSI architecture.
References:

[1] T. R. N. Rao, and E. Fujiwara, Error-Control Coding for Computer Systems. Pretice-Hall, Englewood Cliffs, N.J., 1989.

[2] R. E. Blahut, Theory and Practice of Error Control Codes. Addison-Wesley, Reading, Mass., 1983.

[3] W. W. Peterson, and E. J. Weldon, Jr., Error-Correcting Codes. 2nd ed., The MIT Press, Cambridge, Mass., 1972.

[4] S. Lin, and D. J. Costellor, Jr., Error Control Coding. Prentice Hall, Englewood Cliffs, N.J., 1983.

[5] S. W. Wei, and C. H. Wei, "High speed decoder of Reed-Solomon codes," IEEE Trans. Commun., vol.COM-41, no.11, pp. 1588–1593, November 1993.

[6] S. R. Whitaker, J. A. Canaris, and K. B. Cameron, "Reed Solomon VLSI codec for advanced television," IEEE Trans. Circuits and Systems for Video Technology, vol.1, No.2, pp.230–236, June 1991.

[7] S. W. Wei, and C. H. Wei, "A high-speed real-time binary BCH decoder," IEEE Trans. Circuits and Systems for Video Technology, vol.3, no.2, pp. 138–147, April 1993.

[8] E. R. Berlekamp, "Bit-serial Reed-Solomon encoders," IEEE Trans. Inform Theory, vol. IT-28, pp. 869–874, 1982.

[9] C. C. Wang, T. K. Truong, H. M. Shao, L. J. Dentsch, J. K. Omura, and I. S. Reed, "VLSI architectures for computing multiplications and inverses in GF($2^m$)," IEEE Trans. Comput., vol. C-34, pp. 709–716, 1985.

[10] C. -S. Yeh, Irving S. Reed, and T. K. Truong, "Systolic multipliers for finite fields GF($2^m$)," IEEE Trans. Comput., vol. C-33, pp.357–360, 1984.

[11] B. A. Laws, Jr., and C. K. Rushforth, "A cellular-array multiplier for GF($2^m$)," IEEE Trans. Comput., vol. C-20, pp. 1573–1578 1971.

[12] H. Okano, and H. Imai, "A construction method of high-speed decoders using ROM's for Bose-Chaudhuri-Hocquenghem and Reed-Solomon codes," IEEE Trans. Comput., vol. C-36, pp. 1165–1171, 1987.

[13] K. Araki, I. Fujita, and M. Morisue, "Fast inverter over finite field based on Euclid's algorithm," Trans. IEICE, vol. E-72, pp.1230–1234, November 1989.

[14] P. A. Scott, S. J. Simmons, S. E. Tavares, and L. E. Peppard, "Architectures for exponentiation in GF($2^m$)," IEEE J. Selected Areas in Commmun., vol.6, No.3, pp.578–586, April 1988.

[15] C. C. Wang, and D. Pei, "A VLSI design for computing exponentiations in GF($2^m$) and its application to generate pseudorandom number sequences," IEEE Trans. Comput., vol. C-39, No.2, pp. 258–262, February 1990.

[16] A. M. Odlyzko, "Discrete logarithms in finite fields and their cryptographic significance," in Adv. Cryptol., Proc. Eurocrypt'84, pp.224–314, Paris, France, April 1984.

Arithmetic Operations based on Finite Field GF($2^m$) have recently called significant attention because of their important and practical applications in the areas of computers and communications, such as the forward error-correction codes (recommended references [1]–[4]). To configure an error-correcting decoder with a high decoding speed and low circuit complexity, well designed basic arithmetic circuits in association with a powerful decoding algorithm are required. Therefore improvements in the design of finite field arithmetic circuits that yield lower circuit complexity, shorter computation delay, and higher computation speed is an extensive research topic in finite field arithmetic. Not only addition and multiplication, but also exponentiation and multiplicative inverse as well as division are essential arithmetic operations for error-correcting codes. For example, the most popular decoding procedure for a quat-error-correcting binary primitive BCH code consists of three main steps (recommended references [2]–[4]): (i) calculating the syndrome values $S_i$, i=1, 3, 5, 7 from the received word; (ii) determining the error-locator polynomial $\sigma(x) = x^4 + \sigma_1 x^3 \sigma_2 x^2 + \sigma_3 x + \sigma_4$ from the syndrome values, where $\sigma_1 = S_1$, $\sigma_2 = \{\{S_1[S_7 + (S_1)^7]\} + \{S_3[S_5 + (S_1)^5]\}\}/\{\{S_3[S_3 + (S_1)^3\} + \{S_3[S_5 + (S_1)^5]\}\}$, $\sigma_3 = (S_1)^3 + S_3 + S_1\sigma_2$, and $\sigma_4 = \{[S_5 + S_3(S_1)^2] + [S_3 + (S_1)^3]\sigma_2\}/S_1[2]$; (iii) solving for the roots of $\sigma(x)$, which are the error locators. To determine the coefficients of the error locator polynomial, $\sigma_2$, $\sigma_3$, and $\sigma_4$ in such a way may require additions, multiplications, exponentiations, and inversions (or divisions). The arts for additions and multiplications suggested by the inventor of the present invention have been disclosed in the application filed in November of 1997. One can obviously see from the above example that multiplication is one of the most frequently used field arithmetic operations. However, performing some operations, e.g. exponentiation, using ordinary multiplication might be inefficient. For instance, the above example of quat-error-correcting binary primitive BCH code requires several multiplications to calculate $[S_7+(S_1)^7]$ in $\sigma_2$, but requires only two $AB^2+C$ operations to obtain the same result (that is, $S_1[S_1(S_1)^2+0]^2+S_7$). It is confirmed by these references that the $AB^2+C$ operation is an efficient tool to implement such a computation. As will be discussed in the present invention, the $AB^2+C$ operation can also be used to execute exponentiations and inversions efficiently. It must be noted the $AB^2+C$ operations, exponentiations, inversions, and divisions are also frequently used in decoding other binary BCH and Reed-Solomon (RS) codes (recommended references [5]–[7]). Division computations based on $AB^2+C$ operation will be disclosed in another divisional application suggested by the same inventor.

As stated in the application disclosed by the same inventor and filed in November of 1997, many architectures over GF($2^m$) have already been developed upon various bases, such as a bit-serial multiplier that uses a dual basis (recommended reference [8]), a multiplicative inverter that uses a normal basis (recommended reference [9]), and a systolic multiplier that uses a standard basis (recommended reference [10]). The finite field operations of the first two types need basis conversion, whereas the third one does not. Each type of finite field operation possesses distinct features that make it suitable for specific applications. For decoders used in computers and digital communications, the standard basis is still the most frequently used basis. Therefore the exponentiation circuits and inverter suggested by the present invention are operated over the standard basis.

It is difficult to design a finite field arithmetic circuit having low circuit complexity while simultaneously maintaining a high computation speed. In general, a trade-off between computation speed and circuit complexity is often necessary.

In principle, a multiplicative inverse can be implemented using a read-only memory (ROM) (recommended reference [12]), Euclid's algorithm (recommended reference [13]), or a number of consecutive multiplications (recommended reference [9]). Most of the architectures for computing multiplicative inverses have been developed upon the normal basis. A major reason for the development is that the squaring operation in the normal basis is just a simple cyclic shift (recommended reference [9]). Computation of exponentiation resembles the computation of multiplicative inverse. Exponentiation can also be implemented using ROM and successive multiplications. Several architectures for computing exponentiation in $GF(2^m)$ have been developed upon the standard as well as the normal bases (recommended reference [14]-[15]).

SUMMARY OF THE INVENTION

Objects of the Invention:

The general object of the present invention is to provide a circuit of simple and systematic structure for performing $b^N$ (power N of b) and $b^{-1}$ (multiplicative inverse of b) computations in a finite field $GF(2^m)$ where b is an arbitrary element of $GF(2^m)$.

The specific object the present invention is to utilize power ($AB^2$) computation circuits for configuring a circuit of simple and systematic structure (pipeline architecture) to perform $b^N$ (power N of b) and $b^{-1}$ (multiplicative inverse of b) computations in a finite field $GF(2^m)$ where b is an arbitrary element of $GF(2^m)$.

Another particular object of the present invention is to provide a circuit of simple and systematic structure to perform $b^N$ (power N of b) and $b^{-1}$ (multiplicative inverse of b) computations in a finite field $GF(2^m)$, based on which, error-correction coding, that are relevant to communication, can be efficiently implemented.

Introduction to Algorithm for Pipeline Architecture for Exponentiation Computations in $GF(2^M)$ Based on Power-sum Circuits Let P be an element of $GF(2^m)$, the conventional exponentiation over $GF(2^m)$ is defined as (recommended reference [14], [16])

$$P=R^N, \text{ where } 0 \leq N \leq n-1, \text{ and } n=2^m-1 \quad (12)$$

in which R (another symbol which is popularly used in the field is $\alpha$) is the primitive element of $GF(2^m)$. A more general definition of exponentiation for $GF(2^m)$ (recommended reference [17]) defines $$P=b^N, 0 \leq N \leq n-1, \quad (13)$$

in which b may be arbitrary element of $GF(2^m)$. For the special case of b=R, (13) [hereinafter (n) means equation (n)] represents a conventional definition, as shown in (recommended reference [14], [16]). In this paper, we consider the more general definition of (13). For an integer $N \leq n-1$ where $n=2^m-1$, N can be expressed as $$N=N_0+N_1 \times 2+N_2 \times 2^{2}+ \cdots +N_{m-1} \times 2^{m-1}, N_i \in \{1,0\}, i=0, 1, 2, \ldots, m-1, \quad (14)$$

and may also be represented by an m-tuple vector $[N_0\ N_1\ N_2\ \ldots\ N_{m-1}]$, with $N_0$ called the least significant bit (LSB) and $N_{m-1}$ called the most significant bit (MSB). By means of the representation in (13), the exponentiation of b can be expressed as $$b^N = (b^{N0})(b^{N1 \times 2})(b^{N2 \times 2^2}) \ldots (b^{Nm-1 \times 2^{m-1}}) \quad (15)$$
$$= (b^{N0})(b^{N1})^2(b^{N2})^{2^2} \ldots (b^{Nm-1})^{2^{m-1}}$$
$$= b^{N0}\left[b^{N1}(b^{N2})^2 \ldots (b^{Nm-1})^{2^{m-2}}\right]^2$$
$$= b^{N0}\left[b^{N1}\left[(b^{N2}) \ldots (b^{Nm-1})^{2^{m-3}}\right]^2\right]^2$$
$$= \ldots$$
$$= b^{N0}\left[b^{N1}\left[b^{N2}\left[\ldots \left[b^{Nm-2}(b^{Nm-1})^2\right]^2\right]^2\right]^2\right]^2$$

in which $b^{Ni}=b$ if $Ni=1$ and $b^{Ni}=R^0=1$ if $Ni=0$ \quad (16)

where $R^0$ represents the element $\alpha^0=1$ of the finite field

Based on (15), a simple algorithm for computing exponentiation in $GF(2^m)$ is presented as follows:

---

<Exponentiation Algorithm I>
IF $N_{m-1} = 1$ THEN P= b ELSE P = $R^0$
(where $R^0$ represents the element $\alpha^0=1$ of the finite field)
FOR i = m-2 TO 0
{
IF $N_i = 1$ THEN P=$P^2$ b ELSE P = $P^2$ $R^0$
}
The final result is P = $b^N$.

---

Introduction to Algorithm for Pipeline Architecture for Inverting Computations in $GF(2^m)$ Based on Exponentiation Algorithm Multiplicative inverse (inverting computation) can be considered as a special case of exponentiation because $\beta^{-1}=\beta^\lambda-1$ (where $\lambda=n=2^m-1$). The concept of computing inverse using consecutive multiplications may be implemented for the standard basis as well as the normal basis. Most architectures have been presented for the normal basis since squaring is only a simple cyclic shift in the normal basis and a multiplicative inverse can be obtained from the condition of $\lambda=2^m-1$ as follows (recommended reference [9]):

$$\beta^{\lambda-1}=(\beta 2)(\beta 2^2) \ldots (\beta 2^{m-1})=\beta 2+2^2+\ldots+2^{m-1}. \quad (17)$$

because $\lambda-1=_2m_{-2}=2+2^2+ \ldots +2^{m-1}$

For the standard basis, it is difficult to compute an inversion using (17) since the number of multiplications is very large. With the help of the power-sum circuit disclosed by the same inventor in the application filed November of 1997, and the architecture for exponentiation computation presented above, the task of consecutive multiplications becomes realizable with the standard basis. Since $\lambda-1$ can be expressed, as can be seen from (17), as a fixed m-tuple vector $[0\ 1\ 1\ 1\ ..\ 1]$, we have $N_0=0$ and $N_i=1$ for $i=1, 2, \ldots, m-1$, and it can be inferred from (15)&(16) that $$\beta^{-1}=\beta^{\lambda-1}=R^0[\beta[\beta[ \ldots [\beta(\beta)^2]^2]^2]^2. \quad (18)$$

The computation algorithms for multiplicative inverse can then be represented as follows:

---

<Inversion Algorithm I>
P= b
FOR i = m−2 TO 1
{
P= bP$^2$
}
P = P$^2$

---

The final result is P=b$^{-1}$.

---

<Inversion Algorithm II>
P = R$^0$ (where R$^0$ $^{represents}$ the element $\alpha^0$=1 of the finite field)
FOR i = m−1 TO 1
{
P =bP$^2$
}
P = P$^2$
The final result is P = b$^{-1}$.

---

Introduction to Embodied Circuits for Performing $\beta^N$ and $\beta^{-1}$ Computations Based on the Present Invention Based on the above algorithms, an exponentiation circuit for performing b$^N$ (power N of b) computations in a finite field GF(2$^m$), where b is an arbitrary element of GF(2$^m$), m is the field size of the finite field GF(2$^m$), and N is an integer (0≦N≦2$^{m-1}$) expressed as N=N$_0$+N$_1$2+N$_2$2$^2$+ . . . +N$_i$2$^i$+ . . . +N$_{m-1}$2$^{m-1}$ where N$_i$ is selected from among the elements 0 and 1 of the finite field for i ranging from 0 to m−1 (i=0, 1, 2, . . . , m−1), may be embodied by comprising:

a group of m multiplex circuits Ui respectively inputting both N$_i$ and $^b$ where integer i ranges from 0 to m−1 (i=0, 1, 2, . . . , m−1), and respectively providing output signals Ou$_i$ where Ou$_i$=b if N$_i$=1 and Ou$_i$=1 if N$_i$=0 for i ranging from 0 to m−1 (i.e., Ou$_0$, Ou$_1$, Ou$_2$, . . . Ou$_{m-1}$); and a group of m−1 power-sum circuits PK i where i ranges from 0 to m−2 (i=0, 1, 2, . . . , m−2), each having a first input pin, a second input pin, and an output pin for providing an output signal Sp =E*F$^2$ in response to a signal E applied to first input pin and a signal F applied to second pin, where E and F being arbitrary elements in finite field, and * being a multiplication operation over finite field, Ou$_{m-1}$ being applied to second input pin of PK$_{m-2}$, and the Oui for i ranging from 0 to m−2 (i=0, 1, 2, . . . , m−2) being applied to the first input pin of PK i, the output signal Sp provided by the output pin of PK i for i ranging from 1 to m−2 (i=1, 2, . . . , m−2) being applied to the second input pin of PK i−1, the output signal Sp provided by the output pin of PK$_0$ is b$^N$.

In the above exponentiation circuit, each of the circuits U$_i$ where i ranges from 0 to m−1 (i=0, 1, 2, . . . , m−1), and each of the power-sum circuits PK$_i$ where i ranges from 0 to m−2 (i=0, 1, 2, . . . , m−2) respectively comprises a latch for controlling the time of providing the output signals Ou$_i$ and the Sp, to assure that the first input pin and the second input pin of the power-sum circuits PK$_i$ respectively receives the output signal Oui and the Sp simultaneously.

Each of the above circuits U$_i$ comprises two multiplex input pins for respectively inputting N$_i$ and b simultaneously.

The above exponentiation circuit may farther comprise a clock pulse generator for generating a sequence of clock pulses P$_n$ where n ranges from 1 to an integer G which is not smaller than m−1, and it may be so configured that the multiplex input pins of the multiplex circuits U$_i$ inputting both N$_i$ and b where i ranges from 0 to m−1, in response to the clock pulses P$_n$ in such a way that when the multiplex input pins of the multiplex circuits U$_{m-i}$ respectively inputs N$_{m-i}$ and b in response to the J-th (J is a positive integer) pulse of the clock pulses for i ranging from 1 to 2, the multiplex input pins of the multiplex circuits U$_{m-k}$ respectively inputs N$_{m-k}$ and b in response to the (J+k−i) -th pulse of the clock pulses where k ranges from 3 to m and (J+k−i)≦G The above exponentiation circuit may further comprise an input auxiliary circuit for controlling the multiplex input pins of the multiplex circuits U$_{m-k}$ to input the element of 0 of the finite field in response to the y-th pulse of the clock pulses where y ranges from J+1 to J+k−i for i=2 and for k ranging from 3 to m.

It can be seen a second version of exponentiation circuit for performing b$^N$ (power N of b) computations in a finite field GF(2$^m$) where b is an arbitrary element of GF(2$^m$), m is the field size of the finite field GF(2$^m$), and N is an integer (0≦N≦2$^{m-1}$) expressed as N=N$_0$+N$_1$2+N$_2$2$^2$+ . . . +N$_i$2$^i$+ . . . +N$_{m-1}$2$^{m-1}$ where N$_i$ is selected from among the elements 0 and 1 of the finite field for i ranging from 0 to m−1 (i=0, 1, 2, . . . , m−1), may also be embodied by comprising:

a group of m multiplex circuits Ui respectively inputting both N$_i$ and b where integer i ranges from 0 to m−1 (i=0, 1, 2, . . . , m−1), and respectively providing output signals Ou$_i$ where Ou$_i$=b if N$_i$=1 and Ou$_i$=1 if N$_i$=0 for i ranging from 0 to m−1 (i.e., Ou$_0$, Ou$_1$, Ou$_2$, . . . , Ou$_{m-1}$); and a group of m power-sum circuits PK i where i ranges from 0 to m−1 (i=0, 1, 2, . . . , m−1), each having a first input pin, a second input pin, and an output pin for providing an output signal Sp=E*F$^2$ in response to a signal E applied to the first input pin and a signal F applied to the second pin, where E and F being arbitrary elements in the finite field, and * being a multiplication operation over the finite field, the Oui being applied to the first input pin of the PK i for i ranging from 0 to m−1 (i=0, 1, 2, . . . , m−1), the output signal Sp provided by the output pin of the PK i being applied to the second input pin of the PK i−1 for i ranging from 1 to m−1 (i=1, 2, . . . , m−1), and the element 1 of the finite field GF(2$^m$) being applied to the second input pin of the PK i for i=m−1, the output signal Sp provided by the output pin of the PK0 is b$^N$.

Obviously, in the second version of exponentiation circuit, each of the circuits U$_i$ where i ranges from 0 to m−1 (i=0, 1, 2, . . . , m−1), and each of the power-sum circuits PK$_i$ where i ranges from 0 to m−1 (i=0, 1, 2, . . . , m−1) may also be configured to respectively comprise a latch for controlling the time of providing the output signals Ou$_i$ and the Sp, to assure that the first input pin and the second input pin of the power-sum circuit PK$_i$ where i ranges from 0 to m−2 respectively receives the output signal Oui and the sp simultaneously.

Obviously, in the second version of exponentiation circuit, each of he circuits U$_i$ shall comprise two multiplex input pins for respectively inputting N$_i$ and b simultaneously.

Obviously, in the second version of exponentiation circuit, a clock pulse generator may be configured for generating a sequence of clock pulses P$_n$ where n ranges from 1 to an integer G which is not smaller than m−1, the multiplex input pins of the multiplex circuits U$_i$ inputting both $N_i$ and b where i ranges from 0 to m−1, in response to the clock pulses $P_n$ in such a way that when the multiplex input pins of the multiplex circuits $U_{m-i}$ respectively inputs $N_{m-i}$ and b in response to the J-th (J is a positive integer) pulse of the clock pulses for i ranging from 1 to 2, the multiplex input pins of the multiplex circuits $U_{m-k}$ respectively inputs $N_{m-k}$ and b in response to the (J+k−i)-th pulse of the clock pulses where k ranges from 3 to m and (J+k−i)≦G.

Obviously, in the second version of exponentiation circuit, an input auxiliary circuit may also be configured for controlling the multiplex input pins of the multiplex circuits $U_{m-k}$ to input the element of zero of the finite field in response to the y-th pulse of the clock pulses where y ranges from J+1 to J+k−i for i=2 and for k ranging from 3 to m.

It shall be understood that a third version of exponentiation circuit for performing $b^N$ computations in a finite field $GF(2^m)$ where b is an arbitrary element of $GF(2^m)$, m is the field size of the finite field $GF(2^m)$, and N is an integer (0≦N≦$2^m$−1) expressed as $N=N_0+N_12+N_22^2+ \ldots +N_i2^i+ \ldots +N_{m-1}2^{m-1}$ where $N_i$ is selected from among the elements of 0 and 1 of the finite field for i ranging from 0 to m−1 (i=0, 1, 2, . . . , m−1), may also be embodied by comprising:

a multiplex circuit inputting b and a sequence of $N_i$ where i ranges from 0 to m−1 (i=0, 1, 2, . . . , m−1), and providing a sequence of output signal $Ou_i$ where $Ou_i$=b if $N_i$=1 and $Ou_i$=1 if $N_i$=0 for i ranging from 0 to m−1; and a power-sum circuit PK having a first input pin thereof receiving the sequence of output signal $Ou_i$, a second input pin receiving an arbitrary element E of the finite field applied thereto, and an output pin providing an output signal Sp=$Ou_i$* $E^2$ where $Ou_i$ is provided by the multiplex circuit and * being a multiplication operation over the finite field, the element of 1 of the finite field being applied to the second input pin of the PK when the power-sum circuit PK receives $Ou_i$ where i=0, and the output signal Sp being applied to the second input pin of the PK when the power-sum circuit PK receives $Ou_i$ where i ranges from 1 to m−1 (i=1, 2, . . . , m−1), the output signal Sp provided by the output pin of the power-sum circuit when the power-sum circuit PK receives $Ou_i$ where i=m−1, is the $b^N$.

The third version of exponentiation circuit may further comprise a first switch and a second switch, the first switch inputting the element of 1 of the finite field and the output signal Sp, to apply the element of 1 of the finite field to the second input pin of the PK when the power-sum circuit PK receives $Ou_i$ where i=0, and to apply the output signal Sp to the second input pin of the PK when the power-sum circuit PK receives $Ou_i$ where i ranges from 1 to m−1 (i=1, 2, . . . , m−1), the second switch inputting the output signal Sp to provide a controlled output signal when the power-sum circuit PK receives $Ou_i$ where i=m−1, whereby the controlled output signal is $b^N$.

The third version of exponentiation circuit may also further comprise a clock pulse generator for generating a first sequence of pulses and a second sequence of pulses, the first sequence of pulses controlling the first switch and the multiplex circuit in such a way that when the multiplex circuit inputs $N_i$ where i=0 in response to the J-th pulse of the first sequence of pulses, the first switch applies the element of 1 of the finite field to the second input pin of the PK in response to the J-th pulse of the first sequence of pulses, and the multiplex circuit inputs $N_i$ where i ranges from 1 to m−1 in response to the (J+i)-th pulse of the first sequence of pulses, while the first switch applies the output signal Sp to the second input pin of the PK in response to the (J+i)-th pulse of the first sequence of pulses where i ranges from 1 to m−1; the second sequence of pulses controlling the second switch to provide the controlled output signal only when the power-sum circuit PK receives $Ou_i$ where i=m−1, whereby the controlled output signal is the $b^N$.

It shall be understood the third version of exponentiation circuit may further comprise a latch circuit to control the time for the PK to receive the $Ou_i$ and the time for the PK to receive the element of I of the finite field and the output signal Sp applied thereto by the first switch, whereby the PK simultaneously receives the element of 1 of the finite field and the $Ou_i$ where i=0, and simultaneously receives the $Ou_i$ and the output signal Sp provided by the PK in response to the $Ou_{i-1}$ where i ranges from 1 to m−1.

Based on the above exponentiation algorithm accompanied with power-sum circuits, an inverting circuit for computing the inverting element $b^{-1}$ of b in a finite field $GF(2^m)$ where b is an arbitrary element of $GF(2^m)$ and m is the field size of the finite field $GF(2^m)$, may be embodied by comprising:

a group of m−1 power-sum circuits PK i where i ranges from 0 to m−2 (i=0, 1, 2, . . . , m−2), each having a first input pin, a second input pin, and an output pin for providing an output signal Sp=E*$F^2$ in response to E applied to the first input pin thereof and the b applied to the second input pin thereof, where * being a multiplication operation over the finite field, and both E and F are arbitrary elements of the finite field. If b is applied to the second pin of the PK i where i=m−2, the output signal Sp provided by the output pin of the PK i is applied to the second input pin of the PK i−1 for i ranging from 1 to m−2 (i=1, 2, . . . , m−2), and the element 1 (=$\alpha^0$) of the finite field $GF(2^m)$ being applied to the first input pin of the PK i for i=0, the output signal Sp provided by the output pin of the PK i where i=0 is the inverting element $b^{-1}$ of b.

Obviously the above inverting circuit may further comprise a circuit $PK_{m-1}$ having a first input pin inputting b, a second input pin inputting the element 1 of the finite field $GF(2^m)$, and an output pin for providing an output signal Sp=b*$1^2$ where * being a multiplication operation over finite field (clearly the circuit $PK_{m-1}$ is also a power-sum circuit the same as those of the PK i−1 for i ranging from 1 to m−2), while the second input pin of power-sum circuit PK i where i=m−2 connecting output pin of $PK_{m-1}$ instead of inputting b.

In the above inverting circuit each of power-sum circuits $PK_i$ where i ranges from 0 to m−2 (i=0, 1, 2, . . . , m−2) respectively comprises a latch for controlling the time of providing output signal Sp, to assure that first input pin and second input pin of power-sum circuit $Pk_{i+1}$ where i ranges from 0 to m−2 respectively receives b and the Sp simultaneously.

In the above inverting circuit, a clock pulse generator may be configured for generating a sequence of clock pulses $P_n$ where n ranges from 1 to an integer G which is not smaller than m−1, the first input pin of the power-sum circuit $PK_i$ inputting the b in response to the clock pulses $P_n$ in such a way that when both the first input pin and the second input pin of the power-sum circuit $PK_{m-i}$ where i=2, inputs b in response to the J-th (J is a positive integer) pulse of the clock pulses, the first input pin and the second input pin of the power-sum circuit $PK_{m-k}$ respectively inputs, in response to the (J+k−i) -th pulse of the clock pulses, b and the Sp which is provided by the $PK_{m-k+1}$, where i=2, k ranges from 3 to m, and (J+k−i)≦G In the above inverting circuit, an input auxiliary circuit may also be configured for controlling the first input pin of the power-sum circuit $PK_{m-k}$ to input the element of zero of the finite field in response to the y-th pulse of the clock pulses where y ranges from J+1 to J+k−i for i=2 and for k ranging from 3 to m.

Another version of inverting circuit which is based on a power-sum circuit in a one-stage pipeline architecture and is more suitable for large scale computations, may be described as follows:

An inverting circuit for computing the inverting element $b^{-1}$ of b in a finite field $GF(2^m)$ where b is an arbitrary element of $GF(2^m)$ and m is the field size of the finite field $GF(2^m)$, comprising:

a multiplex circuit inputting the b for providing a sequence of output signal $Ou_i$ ($Ou_1, \ldots, Ou_m$) where $Ou_i$=the b for i ranging from 1 to m−1 and $Ou_m$=the element of 1 of the finite field; and a power-sum circuit PK having a first input pin thereof receiving the sequence of output signal $Ou_i$, a second input pin thereof receiving an arbitrary element E of the finite field applied thereto, and an output pin thereof providing an output signal $Sp=Ou_i*(E)^2$ where * being a multiplication operation over the finite field, the element of 1 of the finite field being applied to the second input pin of the PK when the power-sum circuit PK receives the Oui where i=1, and the output signal Sp being applied to the second input pin of the PK when the power-sum circuit PK receives the Oui where i ranges from 2 to m, the output signal Sp provided by the output pin of the power-sum circuit when the power-sum circuit PK receives the Oui where i=m, is the $b^{-1}$.

The above multiplex circuit may further inputs a sequence of $N_i$, where $N_i$=the element of 1 of the finite field for i ranging from 1 to m−1 ($N_1, \ldots, N_{m-1}$), and $N_m$=the element of 0 of the finite field, to provide the Oui which equals the b when $N_i$=the element of 1 of the finite field, and equals the element of 1 of the finite field when $N_m$=the element of 0 of the finite field, whereby the Oui=the b for i ranging from 1 to m−1, and the Oui=the element 1 of the finite field for i=m.

The above inverting circuit may further comprise a first switch and a second switch, the first switch inputting both the element of 1 of the finite field and the output signal Sp, to apply the element of 1 of the finite field to the second input pin of the PK when the power-sum circuit PK receives the Oui where i=1, and to apply the output signal Sp to the second input pin of the PK when the power-sum circuit PK receives the Oui where i ranges from 2 to m (i=2, . . . , m), the second switch inputting the output signal Sp to provide a controlled output signal when the power-sum circuit PK receives the Oui where i=m, whereby the controlled output signal is the $b^{-1}$.

The above inverting circuit may further comprise a clock pulse generator for generating a first sequence of pulses and a second sequence of pulses, the first sequence of pulses controlling the first switch and the multiplex circuit in such a way that when the multiplex circuit inputs the $N_i$ where i=1 in response to the J-th pulse of the first sequence of pulses, the first switch applies the element of 1 of the finite field to the second input pin of the PK in response to the J-th pulse of the first sequence of pulses, and the multiplex circuit inputs $N_i$ where i ranges from 2 to m, in response to the (J+i−1)-th pulse of the first sequence of pulses, while the first switch applies the output signal Sp to the second input pin of the PK in response to the (J+i−1)-th pulse of the first sequence of pulses, where i ranges from 2 to m; the second sequence of pulses controlling the second switch to provide the controlled output signal only when the power-sum circuit PK receives the Oui where i=m, whereby the controlled output signal is the $b^{-1}$.

The above inverting circuit may further comprise a latch circuit to control the time for the power-sum circuit PK to receive the $Ou_i$, and the time for the power-sum circuit PK to receive both the element of 1 of the finite field and the output signal Sp applied thereto by the first switch, whereby the power-sum circuit PK simultaneously receives the element of 1 of the finite field and the Oui where i=1, and simultaneously receives the Oui and the output signal Sp which is provided by the power-sum circuit PK in response to the $Ou_{i-1}$ where i ranges from 2 to m.

BRIEF DESCRIPTION OF A TABLE

Table I shows comparisons of exponentiation computation between using typical multiplier and the new power-sum circuits as suggested by the present invention.

TABLE I

Comparisons of exponentiation circuits between using conventional multiplier and using the new power-sum circuit as suggested by the present invention.

| | Structure | | |
|---|---|---|---|
| Item | One-multiplier Structure | Two-multiplier Structure | new structure |
| function (note *) | $\alpha^N$ | $\alpha^N$ | $\beta^N$ |
| number of clock cycles | 2m | m | 2m |
| decoding delay (clock cycles) | 2m | m | m |
| circuit complexity | 2m 2-input AND m 3-input XOR | 4m 2-input AND 2m 3-input XOR | 3m 2-input AND m 4-input XOR |
| number of latches | 3 | 4 | 3 |

* $\alpha$ is the primitive element while $\beta$ is an arbitrary element in $GF(2^m)$.

DETAILED DESCRIPTION OF THE PREFERRED EMBODIMENTS

Figure 1A:
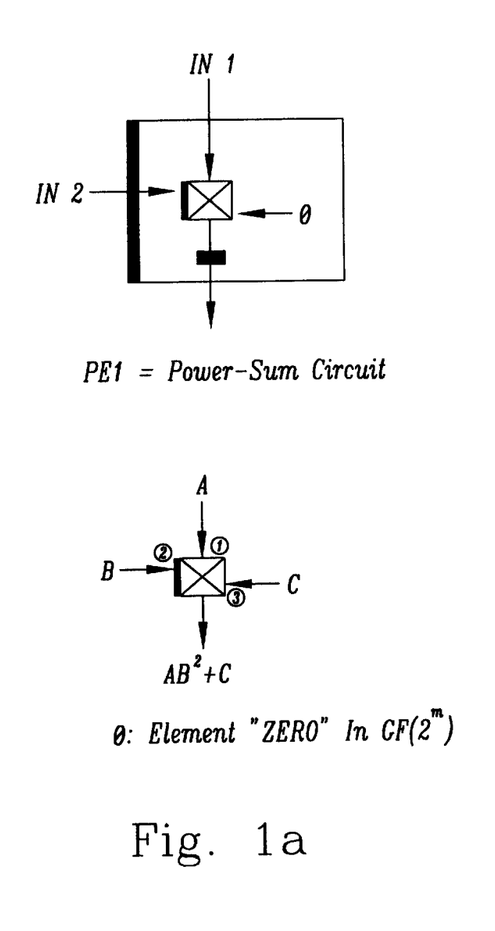
FIG. 1a shows a processing element including a power-sum circuit accompanied with a latch, which functions as one of the main parts of an exponentiation circuit.
Figure 1B:
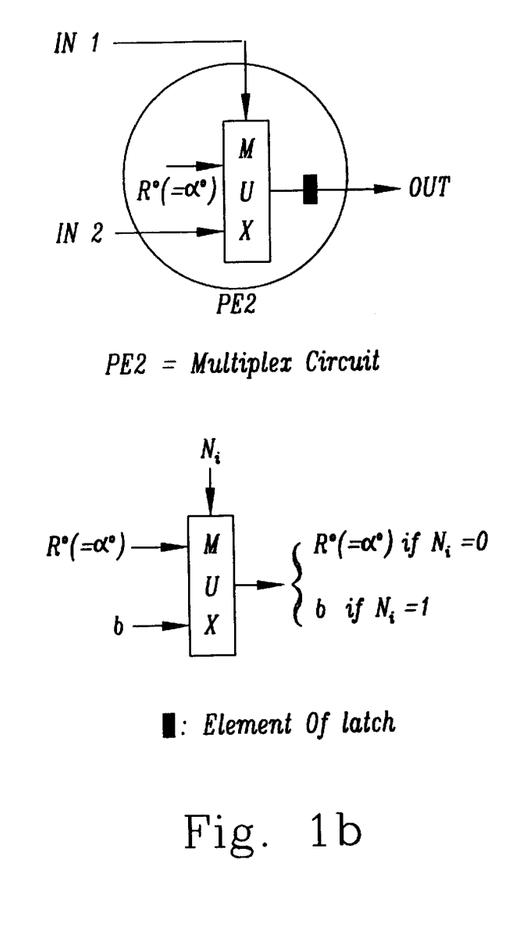
FIG. 1b shows another processing element including a multiplexer accompanied with a latch, which functions as another of the main parts of an exponentiation circuit.
Figure 2A:
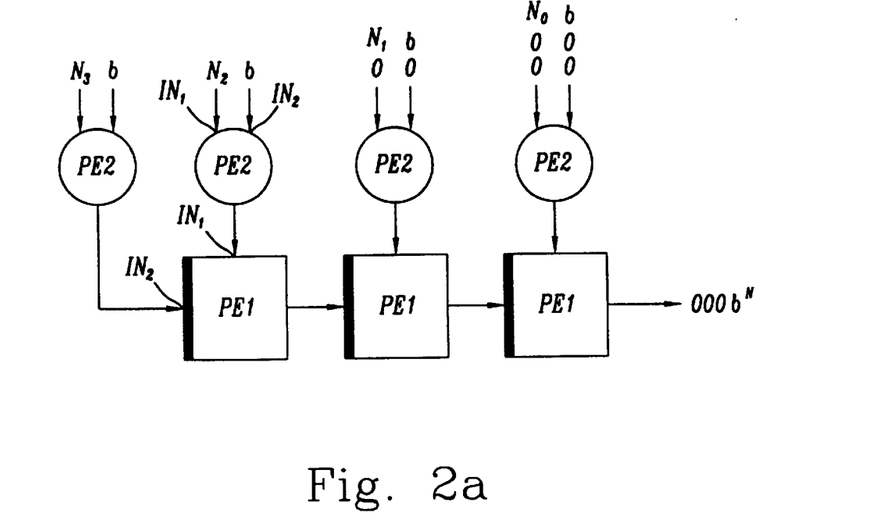
FIG. 2a shows a multi-stage pipeline architecture of an exponentiation circuit for finite field $GF(2^4)$.
Figure 5A:
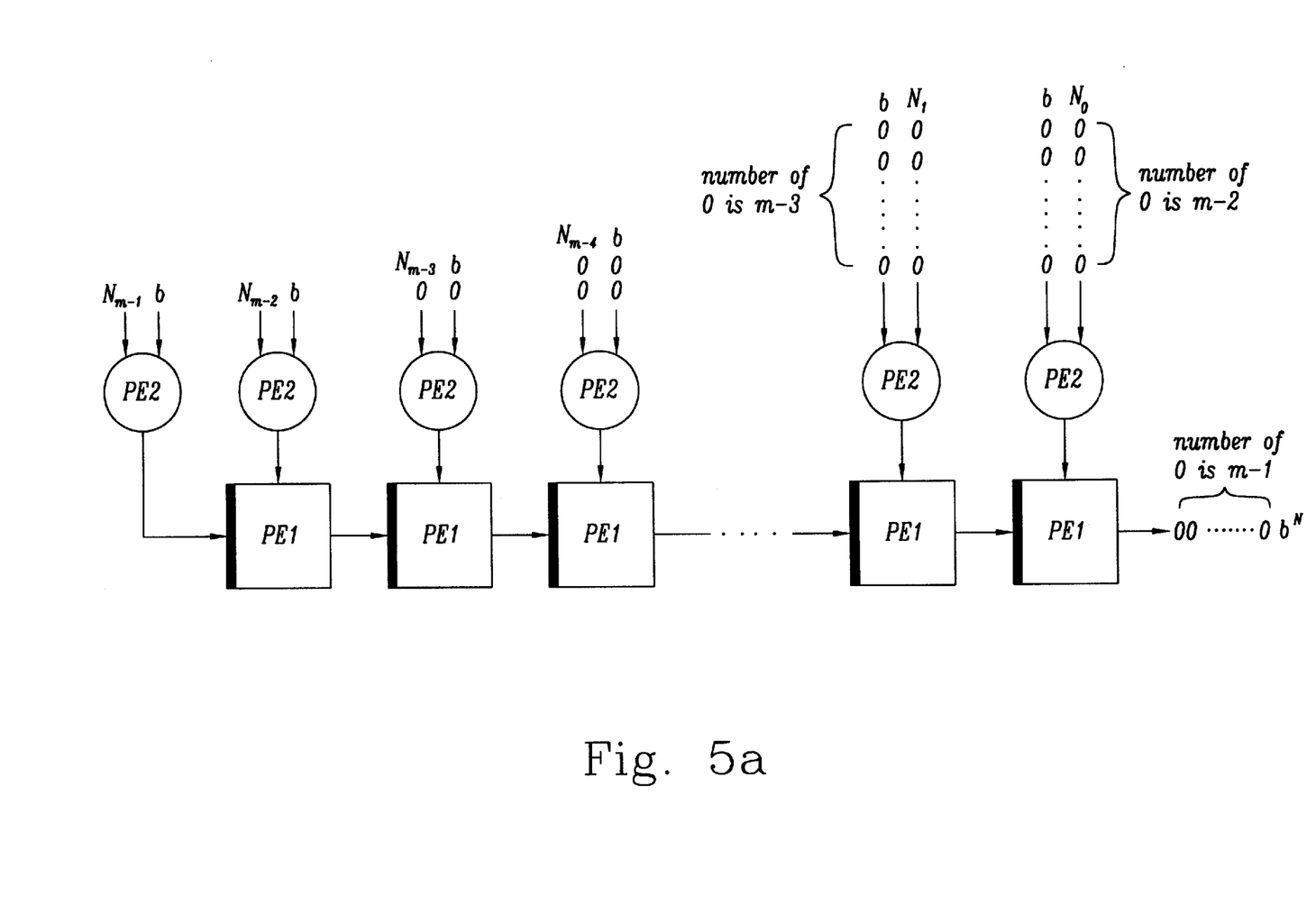
FIG. 5a shows a multi-stage pipeline architecture of an exponentiation circuit for finite field $GF(2^m)$.
Figure 5B:
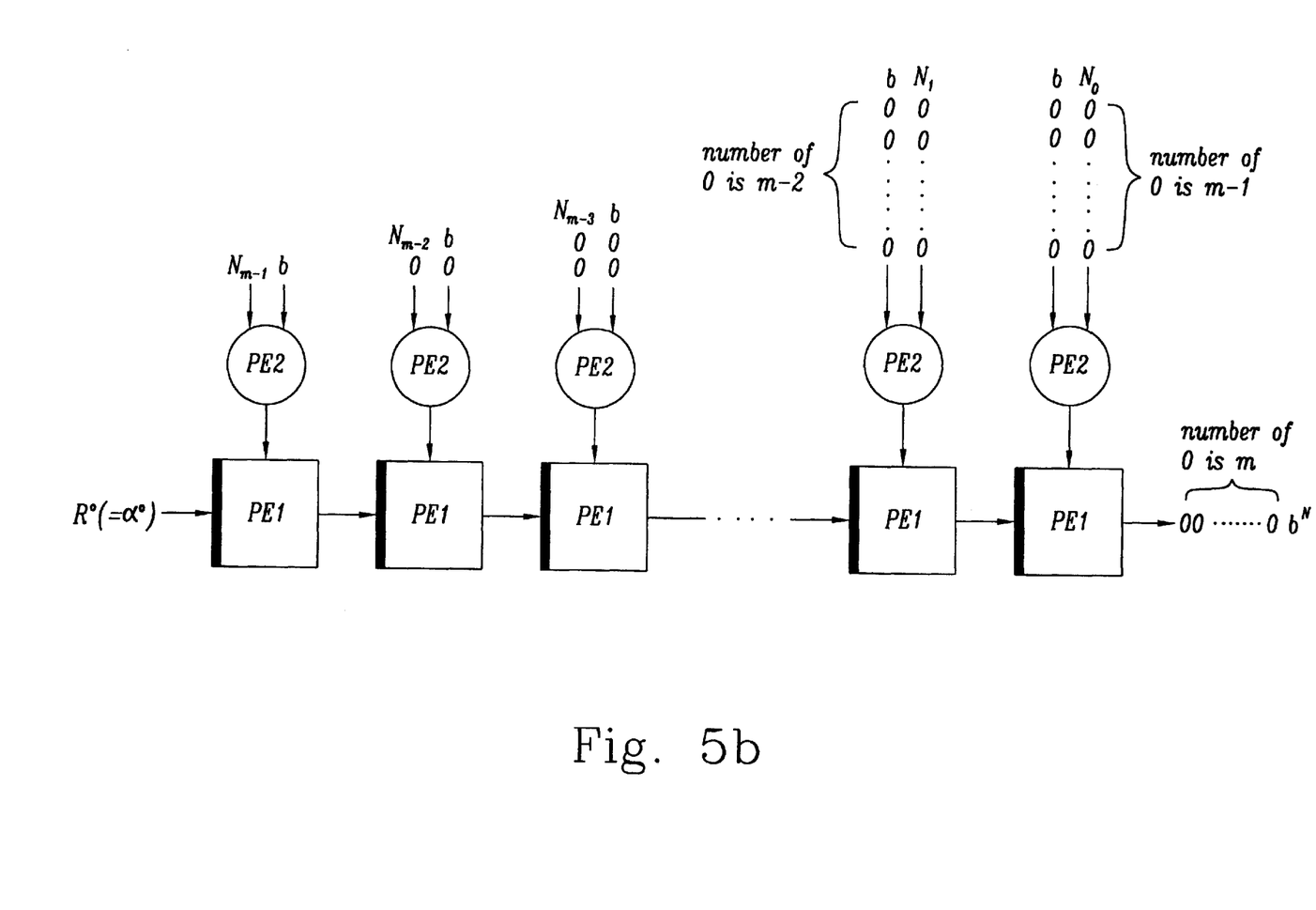
FIG. 5b shows another multi-stage pipeline architecture of an exponentiation circuit for finite field $GF(2^m)$.

The present invention may best be understood through the following description with reference to the accompanying drawings, in which:

According to the above Algorithm I, FIG. 2a shows a VLSI pipeline architecture for computing exponentiation in $GF(2^4)$. Clearly the architecture can be extended in a similar way to any other finite field $GF(2^m)$ as shown in FIG. 5a. A processing element called PE1 is constructed on the basis of a power-sum circuit cascaded using a latch at the output. Another processing element called PE2 is constructed from a 2-input multiplexer (MUX) circuit cascaded using a latch at the output. Detailed circuit diagrams of PE1 and PE2 are respectively shown in FIG. 1a and FIG. 1b. In FIG. 1a, the output of PE1 is $(IN1)(IN2)^2$, where IN1 is the first input port corresponding to element A in an $AB^2+C$ operational structure as disclosed by the same inventor in the application filed November of 1997, and IN2 is the second input port corresponding to B in the same $AB^2+C$ operation. In FIG. 1b, input pin IN1 of PE2 is used to control the MUX. The output of PE2 will be $R^0$ (=$\alpha^0$=element 1 of the finite field) when IN1=0; and the output will be IN2 when IN1=1. When IN1=$N_i$ and IN=b, the output of PE2 will be $R^0$ if $N_i$=0, and will be b if $N_i$=1. Based on the processing elements PE1 and PE2, a multistage pipeline architecture for exponentiations over $GF(2^m)$ is presented in FIG. 5a. The multiplexers (MUXs) in PE2 are set by the value of $N_i$, i=0, 1, 2, . . . , m−1 respectively. When $N_i$=1, the output of the PE2 is element b, whereas when $N_i$=0, the output of the PE2 is the fixed element $R^0$. When the fixed value $R^0$=1 is sent to the first input port of the power-sum circuit (cellular-array power-sum circuit, for example) represented here by PE1, the power-sum circuit works like a square-law circuit (output=$(IN2)^2$) When, on the other hand, the fixed value $R^0$=1 is sent to the 2nd input port of the cellular-array power-sum circuit, the power-sum circuit works like a pass circuit; that is, the output element equals the element applied to its first input port. Elements for latching output signal as shown in FIG. 1a and 1b are required in order to make the signals arrive simultanously at each input of the power-sum circuits, however. An element of the kind of latch in $GF(2^m)$ can be constructed using a combination of m D-type flip-flops in parallel. The latency of the proposed (m−1)-stage pipeline architecture is m−1 clock cycles because (m−1) PE1 circuits are required (each PE1 has one latch). The latency of a pipeline circuit is defined as the time it takes for an element to propagate from the input to the output.

For the conventional definition of exponentiation, b=R (another symbol which is popularly used in the field is a), the value of R can be pre-installed in a buffer. Thus the input required for the architecture is only the m-bit of integer N. The circuit shown in FIG. 2a requires $N_2$, $N_3$, and b to arrive simultaneously at the inputs. However, in some specific applications, $N_{m-2}$ and $N_{m-1}$ (m=4, for example) may not be obtained at the same time. In that case, the above Algorithm I may be further modified to a more regular form as follows:

<Exponentiation Algorithm II>
  P = $R^0$
  (where $R^0$ represents the element $\alpha^0$=1 of the finite field)
  FOR i = m−1 TO 0
  {
    IF $N_i$ = 1 THEN P= $bP^2$ ELSE P = $R^0 p^2$
  }

Figure 2B:
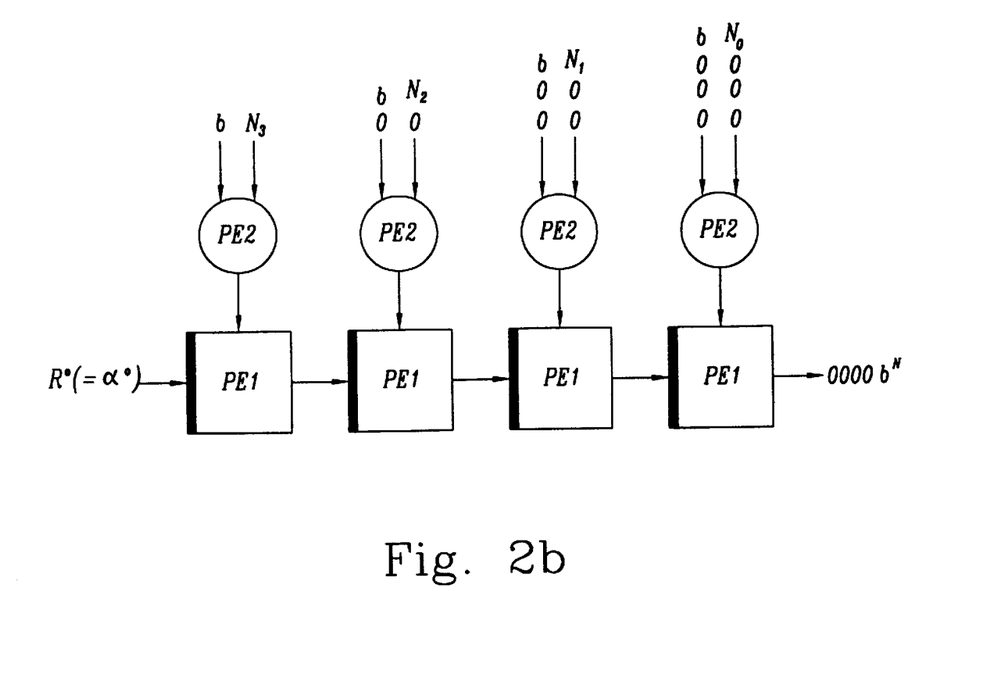
FIG. 2b shows another multi-stage pipeline architecture of an exponentiation circuit for finite field $GF(2^4)$.
Figure 3A:
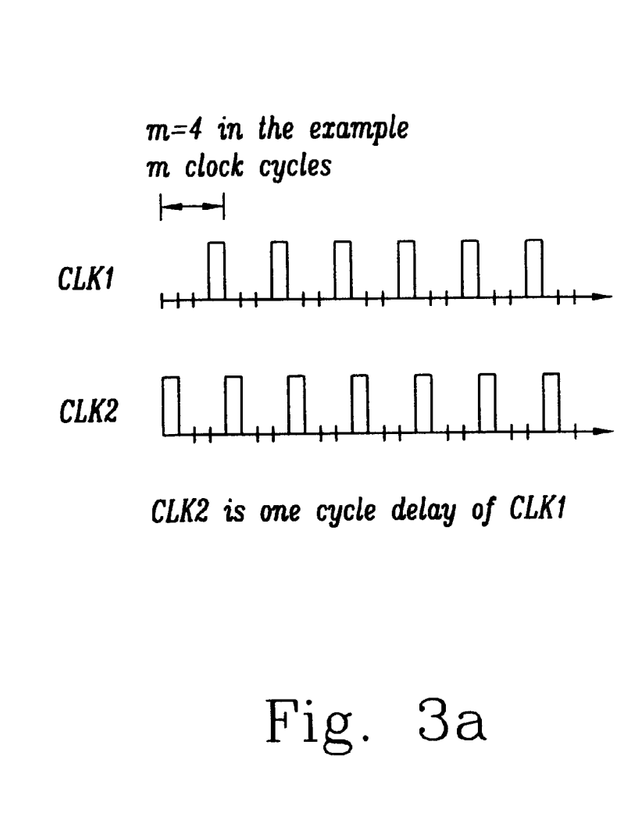
FIG. 3a shows two sequences of clock pulses used in a one-stage pipeline architecture of an exponentiation circuit for finite field $GF(2^4)$.
Figure 3B:
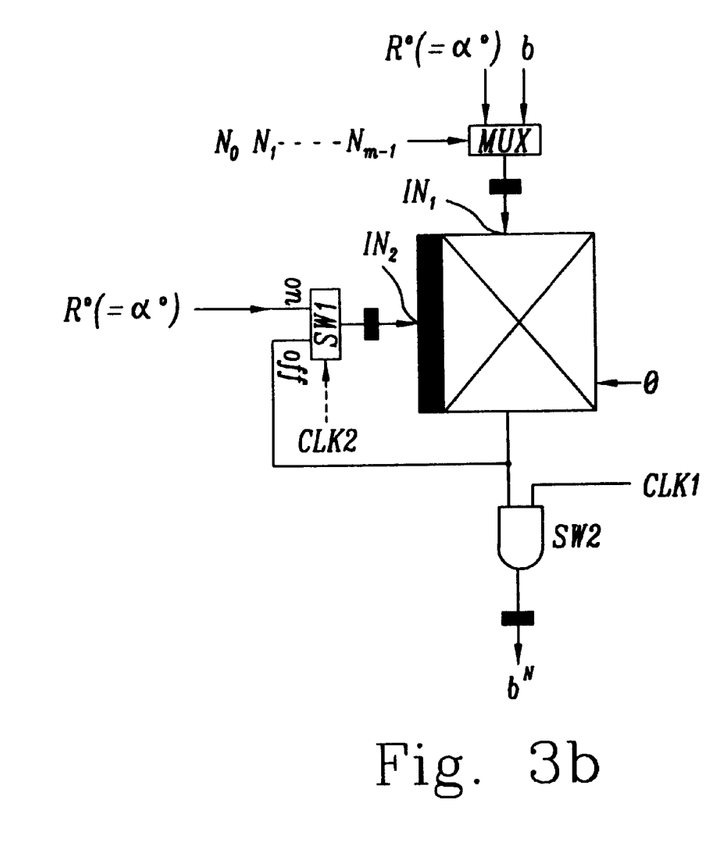
FIG. 3b shows a one-stage pipeline architecture of an exponentiation circuit for finite field $GF(2^4)$.

FIG. 2a may then be re-constructed as shown in FIG. 2b based on Algorithm II. As mentioned earlier, when the fixed value $R^0$=1 is sent to the 2nd input port of the PE1, the PE1 works like a pass circuit. Therefore, the output element of the first PE1 (i.e., the left-most one) will be always the output element of the first PE2. The first PE2 is only used to find b or $R^0$. When $N_{m-1}$=0, the output of the first PE2 is $R^0$; otherwise, it is b. Although the circuit shown in FIG. 2b is more regular, it requires one additional PE1 circuit and one extra clock cycle of latency time. The architectures presented in FIG. 2a and FIG. 2b require m or m−1 power-sum circuits to perform exponentiations over $GF(2^m)$ and are not well suited for larger value of m. Based on Algorithm II, the pipeline architecture may also be implemented using a single-stage pipeline architecture, as shown in FIG. 3b accompanied by FIG. 3a. The one-stage pipeline architecture consists of only one power-sum circuit, one MUX, two switches (SW1 and SW2), and three latches. Control bits $N_i$ where i=0, 1, . . . , m−1, determine the output ($R^0$ or b) of the MUX which is the element applied to the first input pin of the power-sum circuit (as represented by IN1 in FIG. 1a), and in turn determine whether the output of the power-sum circuit is the square of the output of preceding cycle, or the square of the output of preceding cycle multiplied by b (i.e., $P^2$ or $bP^2$, where P indicates the output of the preceding cycle). After m clock cycles, the output is $b^N$ and then SW2 is switched on by CLK1, to output the final result. The required control clocks for the switches are described as follows: The first control clock, CLK1, is a periodic pulse stream ($0^{m-1}$, 1) in which symbol $0^{m-1}$ indicates m−1 consecutive zeros, as shown in FIG. 3a. Obviously, the period of CLK1 is m clock cycles. The second control clock, CLK2, also shown in FIG. 3a, is just a clock delay of CLK1. During the pulse interval of CLK2, switch SW1 pass the element 0 applied to one of its input pins, to the second input pin (IN2) of the power-sum circuit. Beyond the pulse interval of CLK2, switch SW1 pass the element outputted by the power-sum circuit for preceding cycle, to the second input pin (IN2) of the power-sum circuit, resulting in an element [=(IN1)(element outputted by the power-sum circuit for preceding cycle $)^2$] outputted by the power-sum circuit for the current cycle. It can be seen now that one-stage pipeline architecture needs only one power-sum circuit but requires m times more computation time than the m-stage pipeline architecture.

Obviously, we may also have to make a tradeoff between the circuit complexity and the computation speed, such as the two-stage pipeline architecture, the three-stage pipeline architecture, and so on. We may compare the one-stage pipeline architecture with Scott's one-multiplier architecture and two-multiplier architecture. If the field size is fixed, the gate count of the presented one-stage pipeline architecture is about only 75% of that of the two-multiplier architecture. By comparison, we assume that a 3-input XOR is composed of two 2-input XOR gates, and a 4-input XOR consisting of three 2-input XOR gates. On the other hand, the computation speed may be improved by a factor of 2 over the one-multiplier architecture (recommended reference [14]).

Figure 4A:
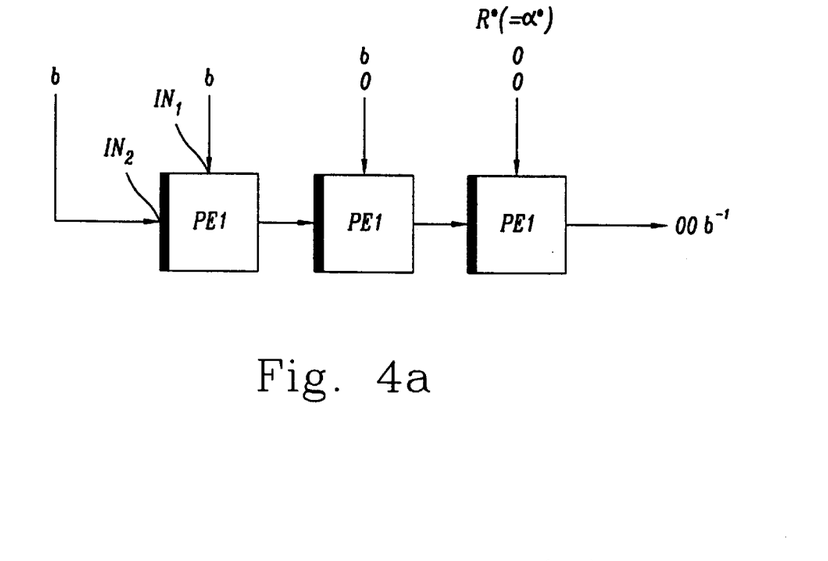
FIG. 4a shows a multi-stage pipeline architecture of an inverter for finite field $GF(2^4)$.
Figure 4B:
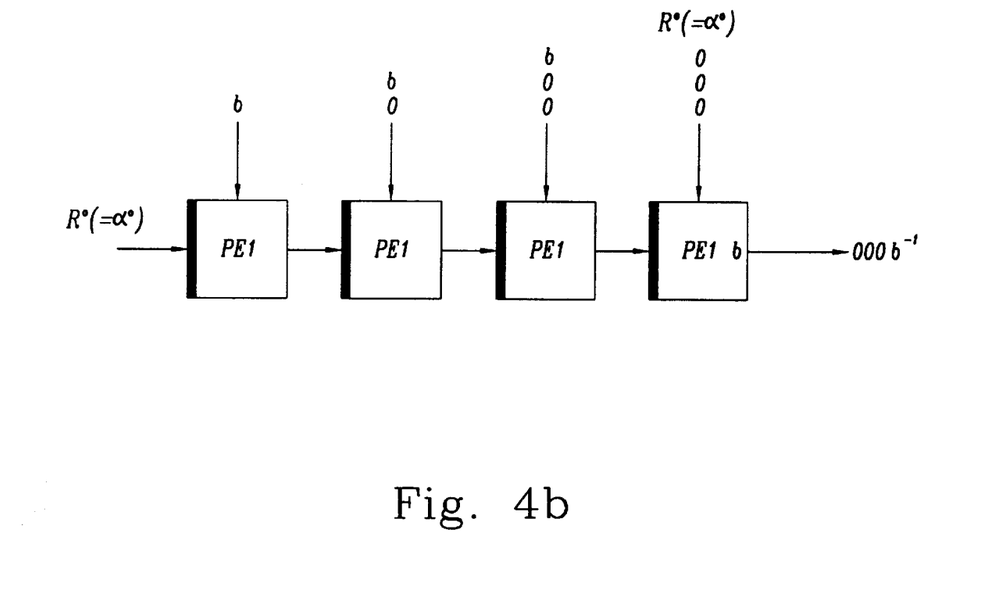
FIG. 4b shows another multi-stage pipeline architecture of an inverter for finite field $GF(2^4)$.
Figure 6A:
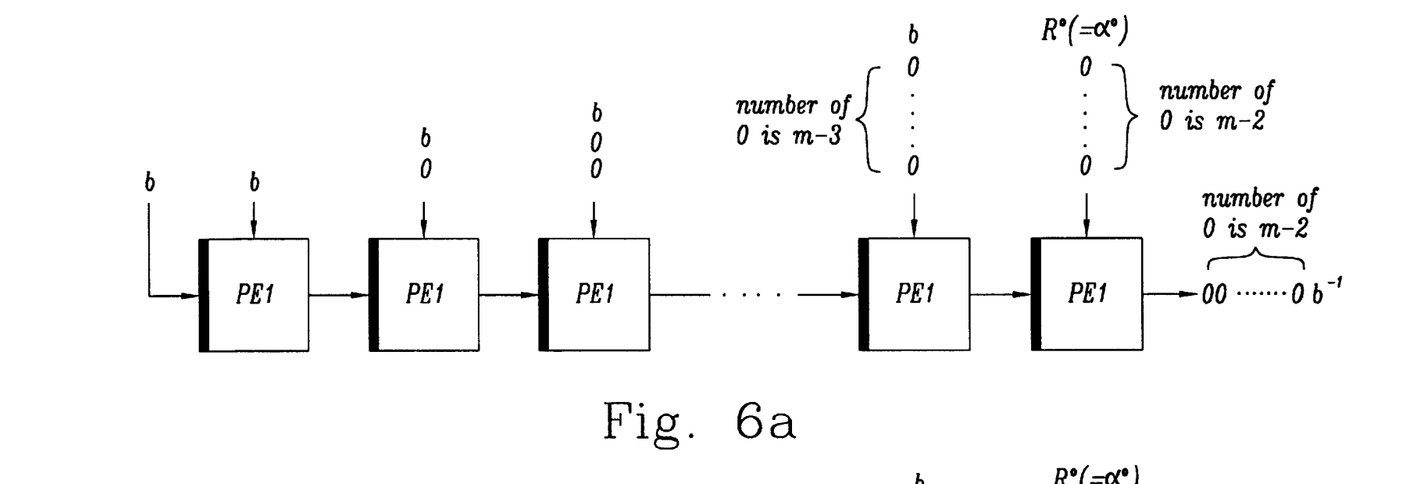
FIG. 6a shows a multi-stage pipeline architecture of an inverter for finite field $GF(2^m)$.
Figure 6B:
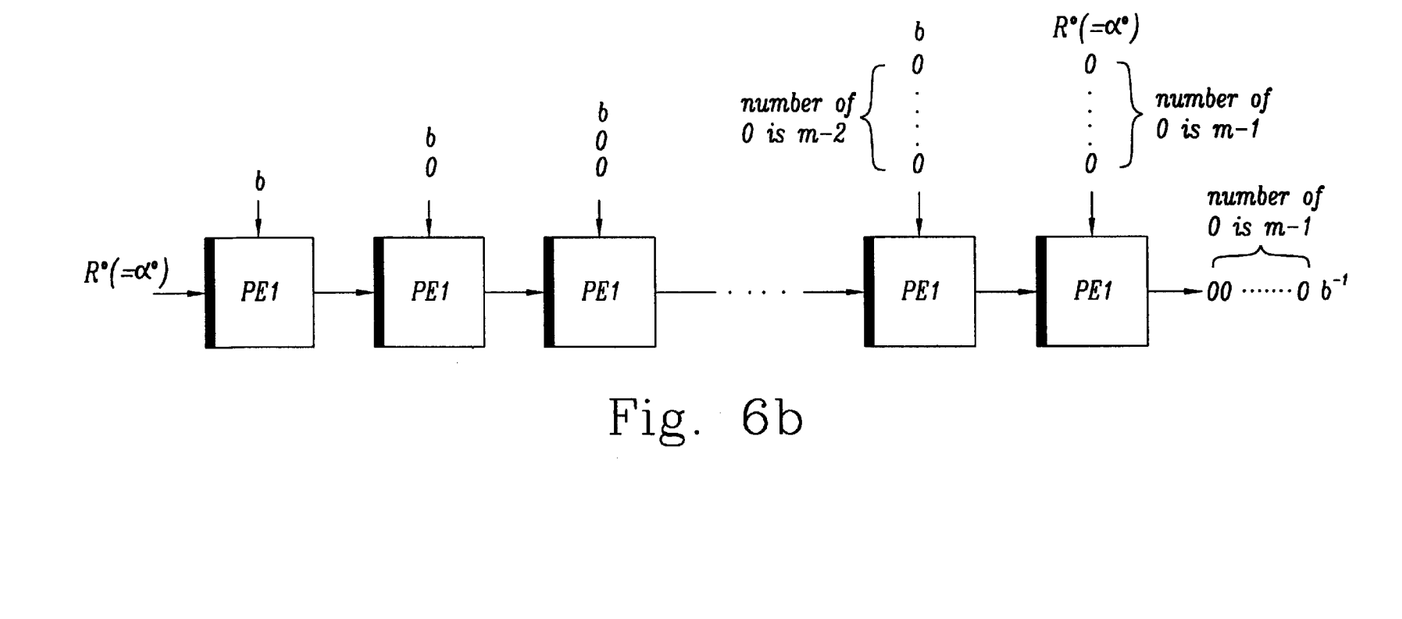
FIG. 6b shows another multi-stage pipeline architecture of an 10 inverter for finite field $GF(2^m)$.

FIG. 4a and FIG. 4b shows the architectures for m-stage and (m'1)-stage pipeline inverters corresponding to the computation algorithms presented above. A comparison of FIG. 4a and FIG. 4b with FIG. 2a and FIG. 2b, reveals that the MUXs (PE2) in FIG. 2a and FIG. 2b can be removed to construct the circuits shown in FIG. 4a and FIG. 4b, since $N_i$ where i=0, 1, . . . , m−1, are fixed. Because $N_0$=0, the input element of the right-most PE1 will always be $R^0$ (where $R^0$ represents the element $\alpha^0$=1 of the finite field). Because $N_i$=1 for i=1, 2, . . . , m−1, the input elements of the left-most PE1 circuits will always be b. For the type-II inverter presented in FIG. 4b, the left-most PE1 is used only to obtain the element b. Thus, we must input $R^0$ at the second input port of PE1 because b=b$(R^0)^2$. Obviously the diagram in FIG. 4a and FIG. 4b can be generalized for inverting computations in a finite field GF($2^m$), as shown in FIG. 6a and FIG. 6b. The hardware circuit for implementing the single-stage pipeline inverter is the same as the single-stage pipeline exponentiator. The operation of the single-stage inverter is similar to the single-stage exponentiator except the control word [$N_0$ $N_1$ $N_2$ . . . $N_{m-1}$] used in the exponentiator is now replaced by a fixed control word [0 1 1 . . . 1] in the inverter. This implies that the same circuit presented in FIG. 3a and FIG. 3b may be used to perform both exponentiations and inversions by just carefully changing the control word pattern.

Figure 7:
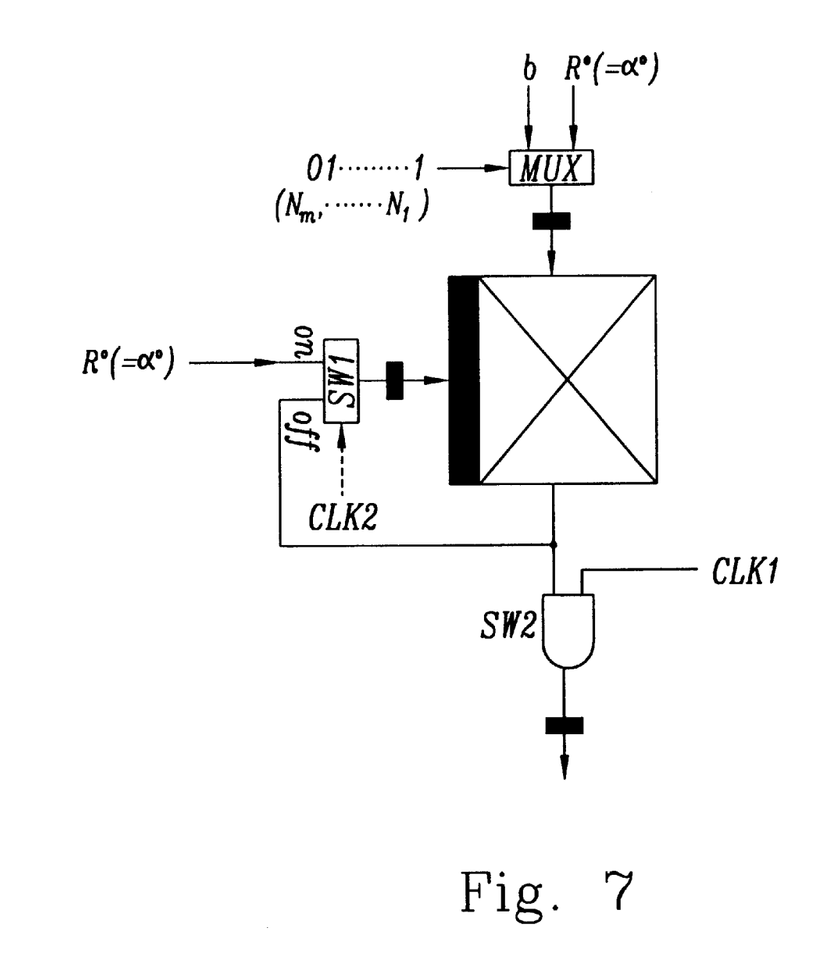
FIG. 7 shows a one-stage pipeline architecture of an inverter for finite field $GF(2^m)$.

FIG. 7 shows a one-stage pipeline architecture of an inverter for finite field GF($2^m$), with clock pulses CLK1 and CLK2 in the analogous type as those illustrated in FIG. 3a. Referring to FIG. 7, switch SW1 is turned on by the second clock pulse CLK2 in the beginning to forward the element of 1 of the finite field to the second input pin of the power-sum circuit PK, and meantime multiplexer MUX forward an arbitrary element b of the finite field received thereat to the first input pin of the PK, the power-sum circuit PK provides an power-sum circuit output signal (an element of the finite field) through its output pin which is connected to an input pin of both switches SW2 and SW1. During the period beyond CLK2, SW1 is turned off to prevent the element of 1 from reaching the power-sum circuit PK while forward the power-sum circuit output signal (provided by the PK in the preceding operation cycle) to the second input pin of the PK. Meantime the PK also receives the element b and in turn provides another power-sum circuit output signal for the current operation cycle. During the m-th operation cycle, multiplexer MUX provides the first input pin of the PK with the element of 1 instead of b, the PK provides, in response to these inputted elements, the SW2 with $b^{-1}$ which is outputted by SW2 only during the m-th operation cycle when clock pulse CLK1 is applied to the SW2, whereby the power-sum circuit output signal provided by the PK is conducted to the second input pin of the PK before CLK1, thereby no incorrect output signal (element of the finite field) can be outputted by SW2.

The above multiplex circuit MUX in FIG. 7 may inputs a sequence of $N_i$, where $N_i$=said element of 1 of said finite field for i ranging from 1 to m−1 ($N_1$, . . . , $N_{m-1}$), and $N_m$=the element of 0 of said finite field, to provide said $Ou_1$ which equals said b when $N_i$=said element of 1 of said finite field, and equals said element of 1 of said finite field when $N_m$=said element of 0 of said finite field, whereby said $Ou_i$=said b for i ranging from 1 to m−1, and said $Ou_i$=said element 1 of said finite field for i=m.

The above inverting circuit in FIG. 7 may further comprise a clock pulse generator for generating a first sequence of pulses and a second sequence of pulses, said first sequence of pulses controlling said first switch and said multiplex circuit in such a way that when said multiplex circuit inputs said $N_i$ where i=1 in response to the J-th pulse of said first sequence of pulses, said first switch applies said element of 1 of said finite field to said second input pin of said PK in response to the J-th pulse of said first sequence of pulses, and said multiplex circuit inputs $N_i$ where i ranges from 2 to m, in response to the (J+i−1)-th pulse of said first sequence of pulses, while said first switch applies said output signal Sp to said second input pin of said PK in response to the (J+i−1)-th pulse of said first sequence of pulses, where i ranges from 2 to m; said second sequence of pulses controlling said second switch to provide said controlled output signal only when said power-sum circuit PK receives said $Ou_i$ where i=m, whereby said controlled output signal is said $b^{-1}$.

The above inverting circuit in FIG. 7 may further comprise a latch circuit to control the time for said power-sum circuit PK to receive said $Ou_i$, and the time for said power-sum circuit PK to receive both said element of 1 of said finite field and said output signal Sp applied thereto by said first switch, whereby said power-sum circuit PK simultaneously receives said element of 1 of said finite field and said $Ou_i$ where i=1, and simultaneously receives said $Ou_i$ and said output signal Sp which is provided by said power-sum circuit PK in response to said $Ou_{i-1}$ where i ranges from 2 to m.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An exponentiation circuit for performing $b^N$ (power N of b) computations in a finite field GF($2^m$), where b is an arbitrary element of GF($2^m$), m is the field size of said finite field GF($2^m$), and N is an integer (0≦N≦$2^{m-1}$−1) expressed as N=$N_0$+$N_1$2+$N_2$$2^2$+ . . . +$N_i$$2^i$+ . . . +$N_{m-1}$$2^{m-1}$ where $N_i$ is selected from among the elements 0 and 1 of said finite field for i ranging from 0 to m−1 (i=0, 1, 2, . . . , m−1), said exponentiation circuit comprising:

a group of m multiplex circuits Ui respectively inputting both $N_i$ and b where integer i ranges from 0 to m−1 (i=0, 1, 2, . . . , m−1), and respectively providing output signals $Ou_i$ where $Ou_i$=b if said $N_i$=1 and $Ou_i$=1 if said $N_i$=0 for i ranging from 0 to m−1; and a group of m−1 power-sum circuits PK i where i ranges from 0 to m−2 (i=0, 1, 2, . . . , m−2), each having a first input pin, a second input pin, and an output pin for providing an output signal Sp=E*$F^2$ in response to a signal E applied to said first input input pin and a signal F applied to said second input pin, where E and F being arbitrary elements in said finite field, and * being a multiplication operation over said finite field, said $Ou_{m-1}$ being applied to said second input pin of said $PK_{m-2}$, and said Oui being applied to said first input pin of said PK i for i ranging from 0 to m−2 (i=0, 1, 2, . . . , m−2), said output signal Sp provided by said output pin of said PK i being applied to said second input pin of said PK i−1 for i ranging from 1 to m−2 (i=1, 2, . . . , m−2) said output signal Sp provided by said output pin of said $PK_0$ is said $b^N$.

2. The exponentiation circuit according to claim 1 wherein each of said circuits $U_i$ where i ranges from 0 to m-1 (i=0, 1, 2, ..., m-1), and each of said power-sum circuits $PK_i$ where i ranges from 0 to m-2 (i=0, 1, 2, ..., m-2) respectively comprises a latch for controlling the time of providing said output signals $Ou_i$ and said Sp, to assure that said first input pin and said second input pin of said power-sum circuits $PK_i$ respectively receives said output signal Oui and said sp simultaneously.

3. The exponentiation circuit according to claim 2 wherein each of said circuits $U_i$ comprises two multiplex input pins for respectively inputting $N_i$ and b simultaneously.

4. The exponentiation circuit according to claim 3 further comprising a clock pulse generator for generating a sequence of clock pulses $P_n$ where n ranges from 1 to an integer G which is not smaller than m-1, said multiplex input pins of said multiplex circuits $U_i$ inputting both $N_i$ and b where i ranges from 0 to m-1, in response to said clock pulses $P_n$ in such a way that when said multiplex input pins of said multiplex circuits $U_{m-i}$ respectively inputs $N_{m-i}$ and b in response to the J-th (J is a positive integer) pulse of said clock pulses for i ranging from 1 to 2, said multiplex input pins of said multiplex circuits $U_{m-k}$ respectively inputs $N_{m-k}$ and b in response to the (J+k-i)-th pulse of said clock pulses where k ranges from 3 to m and (J+k-i)≦G.

5. The exponentiation circuit according to claim 4 further comprising an input auxiliary circuit for controlling said multiplex input pins of said multiplex circuits $U_{m-k}$ to input said element of 0 of said finite field in response to the y-th pulse of said clock pulses where y ranges from J+1 to J+k-i for i=2 and for k ranging from 3 to m.

6. An exponentiation circuit for performing $b^N$ (power N of b) computations in a finite field $GF(2^m)$ where b is an arbitrary element of $GF(2^m)$, m is the field size of said finite field $GF(2^m)$, and N is an 2 integer ($0 \leq N \leq 2^m-1$) expressed as $N = N_0 + N_1 2 + N_2 2^2 + \ldots + N_i 2^i + \ldots + N_{m-1} 2^{m-1}$ where $N_i$ is selected from among the elements 0 and 1 of said finite field for i ranging from 0 to m-1 (i=0, 1, 2, ..., m-1), said exponentiation circuit comprising:

a group of m multiplex circuits Ui respectively inputting both $N_i$ and b where integer i ranges from 0 to m-1 (i=0, 1, 2, ..., m-1), and respectively providing output signals $Ou_i$ where $Ou_i$=b if said $N_i$=1 and $Ou_i$=1 if said $N_i$=0 for i ranging from 0 to m-1; and a group of m power-sum circuits PK i where i ranges from 0 to m-1 (i=0, 1, 2, ..., m-1), each having a first input pin, a second input pin, and an output pin for providing an output signal Sp =$E*F^2$ in response to a signal E applied to said first input pin and a signal F applied to said second input pin, where E and F being arbitrary elements in said finite field, and * being a multiplication operation over said finite field, said Oui being applied to said first input pin of said PKi for i ranging from 0 to m-1 (i=0, 1, 2, ..., m-1), said output signal Sp provided by said output pin of said PKi being applied to said second input pin of said $PK_{i-1}$ for i ranging from 1 to m-1 (i=1, 2, ..., m-1), and said element 1 of said finite field $GF(2^m)$ being applied to said second input pin of said PKi for i=m-1, said output signal Sp provided by said output pin of said $PK_0$ is said $b^N$.

7. The exponentiation circuit according to claim 6 wherein each of said circuits $U_i$ where i ranges from 0 to m-1(i=0, 1, 2, ..., m-1), and each of said power-sum circuits $PK_i$ where i ranges from 0 to m-1 (i=0, 1, 2, ..., m-1) respectively comprises a latch for controlling the time of providing said output signals $Ou_i$ and said Sp, to assure that said first input pin and said second input pin of said power-sum circuit $PK_i$ where i ranges from 0 to m-2 respectively receives said output signal Oui and said sp simultaneously.

8. The exponentiation circuit according to claim 7 wherein each of said circuits $U_i$ comprises two multiplex input pins for respectively inputting $N_i$ and b simultaneously.

9. The exponentiation circuit according to claim 8 further comprising a clock pulse generator for generating a sequence of clock pulses $P_n$ where n ranges from 1 to an integer G which is not smaller than m-1, said multiplex input pins of said multiplex circuits $U_i$ inputting both $N_i$ and b where i ranges from 0 to m-1, in response to said clock pulses $P_n$ in such a way that when said multiplex input pins of said multiplex circuits $U_{m-i}$ respectively inputs $N_{m-i}$ and b in response to the J-th (J is a positive integer) pulse of said clock pulses for i ranging from 1 to 2, said multiplex input pins of said multiplex circuits $U_{m-k}$ respectively inputs $N_{m-k}$ and b in response to the (J+k-i)-th pulse of said clock pulses where k ranges from 3 to m and (J+k-i)≦G.

10. The exponentiation circuit according to claim 9 further comprising an input auxiliary circuit for controlling said multiplex input pins of said multiplex circuits $U_{m-k}$ to input said element of zero of said finite field in response to the y-th pulse of said clock pulses where y ranges from J+1 to J+k-i for i=2 and for k ranging from 3 to m.

11. An exponentiation circuit for performing $b^N$ computations in a finite field $GF(2^m)$ where b is an arbitrary element of $GF(2^m)$, m is the field size of said finite field $GF(2^m)$, and N is an integer ($0 \leq N \leq 2^m-1$) expressed as $N = N_0 + N_1 2 + N_2 2^2 + \ldots + N_{m-1} 2^{m-1}$ where $N_i$ is selected from among the elements of 0 and 1 of said finite field for i ranging from 0 to m-1 (i=0, 1, 2, ..., m-1), said exponentiation circuit comprising:

a multiplex circuit inputting b and a sequence of said $N_i$ where i ranges from 0 to m-1 (i=0, 1, 2, ..., m-1), and providing a sequence of output signal $Ou_i$ where $Ou_i$=b if said $N_i$=1 and $Ou_i$=1 if said $N_i$=0 for i ranging from 0 to m-1; and a power-sum circuit PK having a first input pin thereof receiving said sequence of output signal $Ou_i$, a second input pin receiving an arbitrary element E of said finite field applied thereto, and an output pin providing an output signal Sp=Said Oui*(said E)$^2$ * being a multiplication operation over said finite field, said element of 1 of said finite field being applied to said second input pin of said PK when said power-sum circuit PK receives Said Oui where i=0, and said output signal Sp being applied to said second input pin of said PK when said power-sum circuit PK receives Said Oui where i ranges from 1 to m-1 (i=1, 2, ..., m-1), said output signal Sp provided by said output pin of said power-sum circuit when said power-sum circuit PK receives Said Oui where i=m-1, is said $b^N$.

12. The exponentiation circuit according to claim 11 further comprising a first switch and a second switch, said first switch inputting said element of 1 of said finite field and said output signal Sp, to apply said element of 1 of said finite field to said second input pin of said PK when said power-sum circuit PK receives Said Oui where i=0, and to apply said output signal Sp to said second input pin of said PK when said power-sum circuit PK receives Said Oui where i ranges from 1 to m-1 (i=1, 2, ..., m-1), said second switch inputting said output signal Sp to provide a controlled output signal when said power-sum circuit PK receives Said Oui where i=m-1, whereby said controlled output signal is said $b^N$.

13. The exponentiation circuit according to claim 12 further comprising a clock pulse generator for generating a first sequence of pulses and a second sequence of pulses, said first sequence of pulses controlling said first switch and said multiplex circuit in such a way that when said multiplex circuit inputs said $N_i$ where i=0 in response to the J-th pulse of said first sequence of pulses, said first switch applies said element of 1 of said finite field to said second input pin of said PK in response to the J-th pulse of said first sequence of pulses, and said multiplex circuit inputs $N_i$ where i ranges from 1 to m−1 in response to the (J+i)-th pulse of said first sequence of pulses, while said first switch applies said output signal Sp to said second input pin of said PK in response to the (J+i)-th pulse of said first sequence of pulses where i ranges from 1 to m−1; said second sequence of pulses controlling said second switch to provide said controlled output signal only when said power-sum circuit PK receives Said Oui where i=m−1, whereby said controlled output signal is said $b^N$.

14. The exponentiation circuit according to claim 13 further comprising a latch circuit to control the time for said PK to receive said $Ou_i$ and the time for said PK to receive the element of 1 of said finite field and said output signal Sp applied thereto by said first switch, whereby said PK simultaneously receives the element of 1 of said finite field and said $Ou_i$ where i=0, and simultaneously receives said $Ou_i$ and said output signal Sp provided by said PK in response to said $Ou_{i-1}$ where i ranges from 1 to m−1.

15. An inverting circuit for computing the inverting element $b^{-1}$ of b in a finite field $GF(2^m)$ where b is an arbitrary element of $GF(2^m)$ and m is the field size of said finite field $GF(2^m)$, comprising:

a group of m−1 power-sum circuits PK i where i ranges from 0 to m−2 (i=0, 1, 2, . . . , m−2), each having a first input pin, a second input pin, and an output pin for providing an output signal $Sp=b*b^2$ in response to said b applied to both said first input pin and said second input pin thereof, where * being a multiplication operation over said finite field, said b being applied to said second input pin of said PKi where i=m−2, and to said first input pin of said PKi where i ranges from 1 tp m−2, said output signal Sp provided by said output pin of said PKi being applied to said second input pin of said PK i−1 for i ranging from 1 to m−2 (i=1 2, . . . , m−2), and the element 1 of said finite field $GF(2^m)$ being applied to said first input pin of said PKi for i=0, said output signal Sp provided by said output pin of said PKi where i=0 is said inverting element $b^{-1}$ of said b.

16. The inverting circuit according to claim 15 further comprising a circuit $PK_{m-1}$ having a first input pin inputting said b, a second input pin inputting said element 1 of said finite field $GF(2^m)$, and an output pin for providing an output signal $Sp=b*1^2$ where * being a multiplication operation over said finite field, said second input pin of said power-sum circuit PK i where i=m−2 connecting said output pin of said $PK_{m-1}$ instead of inputting b.

17. The inverting circuit according to claim 15 wherein each of said power-sum circuits $PK_i$ where i ranges from 0 to m−2 (i=0, 1, 2, . . . , m−2) respectively comprises a latch for controlling the time of providing said output signal Sp, to assure that said first input pin and said second input pin of said power-sum circuit $Pk_i$ where i ranges from 1 to m−2 respectively receives said b and said Sp simultaneously.

18. The inverting circuit according to claim 17 further comprising a clock pulse generator for generating a sequence of clock pulses $P_n$ where n ranges from 1 to an integer G which is not smaller than m−1, said first input pin of said power-sum circuit $PK_i$ inputting said b in response to said clock pulses $P_n$ in such a way that when both said first input pin and said second input pin of said power-sum circuit $PK_{m-i}$ where i=2, inputs said b in response to the J-th (J is a positive integer) pulse of said clock pulses, said first input pin and said second input pin of said power-sum circuit $PK_{m-k}$ respectively inputs, in response to the (J+k−i)-th pulse of said clock pulses, said b and said Sp which is provided by said $PK_{m-k+1}$, where i=2, k ranges from 3 to m−1 and (J+k−i)≦G, while said first input pin and said second input pin of said power-sum circuit $PK_{m-k}$ respectively inputs, in response to the (J+k−i)-th pulse of said clock pulses, the element of 1 of said finite field and said Sp which is provided by said $PK_{m-k+1}$, where i=2, k=m and (J+k−i)≦G.

19. The inverting circuit according to claim 18 further comprising an input auxiliary circuit for controlling said first input pin of said power-sum circuit $PK_{m-k}$ to input the element of zero of said finite field in response to the y-th pulse of said clock pulses where y ranges from J+1 to J+k−i for i=2 and for k ranging from 3 to m.

20. An inverting circuit for computing the inverting element $b^{-1}$ of b in a finite field $GF(2^m)$ where b is an arbitrary element of $GF(2^m)$ and m is the field size of said finite field $GF(2^m)$, comprising:

a multiplex circuit inputting said b for providing a sequence of output signal $Ou_i$ ($Ou_1$, . . . ,$Ou_m$) where $Ou_i$=said b for i ranging from 1 to m−1 and $Ou_m$=the element of 1 of said finite field; and a power-sum circuit PK having a first input pin thereof receiving said sequence of output signal $Ou_i$, a second input pin thereof receiving an arbitrary element E of said finite field applied thereto, and an output pin thereof providing an output signal Sp =said $Ou_i$*(said E)$^2$ where * being a multiplication operation over said finite field, said element of 1 of said finite field being applied to said second input pin of said PK when said power-sum circuit PK receives said $Ou_i$ where i=1, and said output signal Sp being applied to said second input pin of said PK when said power-sum circuit PK receives said $Ou_i$ where i ranges from 2 to m, said output signal Sp provided by said output pin of said power-sum circuit when said power-sum circuit PK receives said $Ou_i$ where i=m, is said $b^{-1}$.

21. The inverting circuit according to claim 20 wherein said multiplex circuit further inputting a sequence of $N_i$, where $N_i$=said element of 1 of said finite field for i ranging from 1 to m−1 ($N_1$, . . . ,$N_{m-1}$), and $N_m$=the element of 0 of said finite field, to provide said $Ou_i$ which equals said b when $N_i$=said element of 1 of said finite field, and equals said element of 1 of said finite field when $N_m$=said element of 0 of said finite field, whereby said $Ou_i$=said b for i ranging from 1 to m−1, and said $Ou_i$=said element 1 of said finite field for i=m.

22. The inverting circuit according to claim 21 further comprising a first switch and a second switch, said first switch inputting both said element of 1 of said finite field and said output signal Sp, to apply said element of 1 of said finite field to said second input pin of said PK when said power-sum circuit PK receives said $Ou_i$ where i=1, and to apply said output signal Sp to said second input pin of said PK when said power-sum circuit PK receives said $Ou_i$ where i ranges from 2 to m (i=2, . . . , m), said second switch inputting said output signal Sp to provide a controlled output signal when said power-sum circuit PK receives said $Ou_i$ where i=m, whereby said controlled output signal is said $b^{-1}$.

23. The inverting circuit according to claim 22 further comprising a clock pulse generator for generating a first sequence of pulses and a second sequence of pulses, said first sequence of pulses controlling said first switch and said multiplex circuit in such a way that when said multiplex circuit inputs said $N_i$ where i=1 in response to the J-th pulse of said first sequence of pulses, said first switch applies said element of 1 of said finite field to said second input pin of said PK in response to the J-th pulse of said first sequence of pulses, and said multiplex circuit inputs $N_i$ where i ranges from 2 to m, in response to the (J+i−1)-th pulse of said first sequence of pulses, while said first switch applies said output signal Sp to said second input pin of said PK in response to the (J+i−1)-th pulse of said first sequence of pulses, where i ranges from 2 to m; said second sequence of pulses controlling said second switch to provide said controlled output signal only when said power-sum circuit PK receives said $Ou_i$ where i=m, whereby said controlled output signal is said $b^{-1}$.

24. The inverting circuit according to claim 23 further comprising a latch circuit to control the time for said power-sum circuit PK to receive said $Ou_i$, and the time for said power-sum circuit PK to receive both said element of 1 of said finite field and said output signal Sp applied thereto by said first switch, whereby said power-sum circuit PK simultaneously receives said element of 1 of said finite field and said $Ou_i$ where i=1, and simultaneously receives said $Ou_i$ and said output signal Sp which is provided by said power-sum circuit PK in response to said $Ou_{i-1}$ where i ranges from 2 to m.

* * * * *